United States Patent [19]

Greer

[11] 4,075,139
[45] Feb. 21, 1978

[54] PROCESS OF MAKING A CURED RESOLE FOAM AND PRODUCT PRODUCED THEREFROM

[75] Inventor: Richard L. Greer, Hermosa Beach, Calif.

[73] Assignee: The Upjohn Company, Kalamazoo, Mich.

[21] Appl. No.: 770,286

[22] Filed: Feb. 22, 1977

[51] Int. Cl.² .................................................. C08J 9/14
[52] U.S. Cl. ............................. 260/2.5 F; 260/2.5 FP; 260/45.7 P; 260/59 R; 260/DIG. 24
[58] Field of Search ............... 260/59 R, 2.5 F, 45.7 P

[56] References Cited

U.S. PATENT DOCUMENTS

| | | | |
|---|---|---|---|
| 3,377,317 | 4/1968 | Hoxie | 260/59 R |
| 3,673,130 | 6/1972 | Papa et al. | 260/2.5 F |
| 3,953,645 | 4/1976 | Moss | 260/2.5 F |
| 3,998,789 | 12/1976 | Yoshioka | 260/59 R |

Primary Examiner—Morton Foelak
Attorney, Agent, or Firm—James S. Rose; Denis A. Firth

[57] ABSTRACT

Phenolic foams are disclosed which are obtained by conventional procedures from phenol-aldehyde resole resins and novel premixed catalyst combinations comprising (a) a phosphonate compound

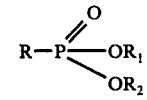

wherein R, $R_1$ and $R_2$ are independently selected from the class consisting of alkyl having from 1 to 8 carbon atoms, inclusive, aryl having from 6 to 12 carbon atoms, inclusive, and aralkyl having from 7 to 13 carbon atoms, inclusive; and (b) an aromatic sulfonic acid. The foams are characterized as non-punking, fire resistant, and fine celled foams which can be prepared at room temperature (about 20° C) in thick sections without splitting or cracking. Furthermore, the foams do not require a heat curing treatment in order to achieve a thermoset state.

11 Claims, No Drawings

PROCESS OF MAKING A CURED RESOLE FOAM AND PRODUCT PRODUCED THEREFROM

BACKGROUND OF THE INVENTION

1. Field of the Invention

This invention relates to phenolic foams and is more particularly concerned with a novel process for producing non-punking phenolic foams.

2. Description of the Prior Art

Phenolic foams, and their various modes of preparation beginning with a resole or a novolac resin, are well known in the art; see, for example, Plastic Foams Part II, pp 639 – 673, edited by K. C. Frisch and J. H. Saunders, 1973, Marcel Dekker Inc., New York, N. Y. Phenolic foams are most commonly produced by the acid curing of a resole resin, and, generally speaking, strong mineral acids have been found to be the most efficient catalysts. But, at the same time, the foams tend to overheat which causes their distortion, cracking, and splitting, especially when formed in anything but small amounts or thin sections so as to allow heat dissipation.

U.S. Pat. No. 2,772,246 discloses the use of combinations of various organic phosphorus acid esters with a mineral acid or phosphoric acid as a means of controlling foam cell size and uniformity during the foam formation. U.S. Pat. No. 3,298,973 teaches the use of boric acid in combination with organic hydroxy acids as resole curatives and also as a means to reduce punking. U.S. Pat. No. 2,933,461 discloses mixtures of phenol sulfonic acid with benzene sulfonic acid or sulfuric acid as useful catalysts. Some art teaches the removal of vaporizable acidic catalysts from the formed phenolic foams by treatment of the foams at high temperatures; see U.S. Pat. No. 3,522,196. U.S. Pat. No. 3,673,130 discloses the use of various phosphorus compounds in conjunction with known acid catalysts to provide non-punking foams. The term "punking" refers to the phenomenon observed when a piece of foam which has been removed from a flame continues to glow and combust without a visible flame. This phenomenon will be discussed in greater detail hereinbelow.

While the prior art discloses the preparation of phenolic foams which have good fire resistance properties including non-punking characteristics and which can be produced within desired density ranges with fine uniform cells, as typically noted in U.S. Pat. No. 3,673,130, such foams are severely limited in the batch size in which they can be prepared. When it is desired to scale-up their preparation above the bench scale level, that is to say preparations greater than a few pounds of foam contained in a thick section, the foams split and crack regardless of what heating cycles or curing steps are employed. This is caused by the high and rapid exotherm arising from the curing reaction of the resole resin, which curing reaction is brought to its peak very rapidly by the prior art catalysts.

U.S. Pat. No. 4,001,148 discloses acid curing agents that call for mixtures of a strong inorganic or organic acid, a glycol, and phosphoric acid wherein the novelty resides in the inclusion of the glycol in order to avoid cracking and bursting of the formed foam block.

It has now been discovered that non-punking phenolic foams of fine uniform cell and controllable densities can be prepared in large mass without cracking or splitting. Further, in contrast to the prior art, it has been discovered that the foams can be prepared using reactants at room temperature. Any heat curing of the resulting foam is purely optional and not necessary to achieve a full thermoset condition.

In a further distinguishing feature over prior art phenolic foams, those of the present invention are characterized as being essentially non-corrosive in terms of the materials with which they come into contact.

The advantageous properties of the present foams are achieved without the need for employing both the corrosive phosphoric acid and a glycol. Although the use of a glycol is not precluded in the present invention.

SUMMARY OF THE INVENTION

This invention comprises a process for the preparation of a phenolic foam from the reaction of a phenol-aldehyde resole resin, a blowing agent and an acidic catalyst wherein the improvement comprises employing a premixed catalyst combination comprising:
(a) an aromatic sulfonic acid; and
(b) a phosphonate compound having the formula

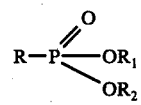

I wherein R, $R_1$ and $R_2$ are independently selected from the class consisting of alkyl having from 1 to 8 carbon atoms, inclusive, aryl having from 6 to 12 carbon atoms, inclusive, and aralkyl having from 7 to 13 carbon atoms, inclusive.

An aromatic sulfonic acid is inclusive of aryl sulfonic acids, hydroxyphenyl sulfonic acids, carboxyphenyl sulfonic acids, and the like. The term aryl is defined hereinafter.

The term "aryl" means the radical obtained by removing one nuclear hydrogen atom from an aromatic hydrocarbon having from 6 to 12 carbon atoms and is inclusive of phenyl, phenyl substituted by alkyl as defined hereinafter, naphthyl, biphenylyl, and the like.

The term "alkyl from 1 to 8 carbon atoms" means methyl, ethyl, propyl, butyl, amyl, hexyl, heptyl, octyl, and isomeric forms thereof.

The term "aralkyl from 7 to 13 carbon atoms" is inclusive of benzyl, p-methylbenzyl, p-ethylbenzyl, β-phenylethyl, naphthylmethyl, benzhydryl, and the like.

The invention also comprises the improved non-punking phenolic foams obtained from the novel process.

DETAILED DESCRIPTION OF THE INVENTION

The phenolic foams in accordance with the present invention are obtained by the acid catalyzed curing of a phenol-aldehyde resole resin using the general procedures well known by those skilled in the art in conjunction with the novel teachings of the present invention. For general methods for the preparation of phenolic foams from resole resins see Plastic Foams cited supra.

The phenol-aldehyde resole resins employed may be any of the known resole resins commercially available. Alternatively, the resins can be easily prepared according to methods well known in the art, see for example U.S. Pat. No. 2,772,246.

Any of the resole resins which are prepared by carrying out the condensation in the ratio of about 1 mole of phenol to from about 1.5 to about 3.0 moles of aldehyde are useful in the present invention. Generally speaking, the resole resin has a viscosity at 25° C of from about 200 centipoises to about 300,000 centipoises, and preferably from about 400 to about 25,000 centipoises.

Illustrative of the phenols which may be used in the preparation of the resole resins are compounds such as phenol, resorcinol, alkyl-substituted phenols such as cresols, xylenols, meta and para-tertiary butylphenol, isopropylphenol, p-phenylphenol, and the like. Phenol itself is the preferred species.

The aldehydes employed can be aliphatic aldehydes, cycloaliphatic aldehydes, aromatic aldehydes, polyaldehydes, and aldehyde liberating compounds. Typical examples include formaldehyde, acetaldehyde, furfuraldehyde, propionaldehyde, butyraldehyde, benzaldehyde, and the like. Typical examples of aldehyde liberating compounds are paraformaldehyde, formalin solution, and the like. A preferred aldehyde is formaldehyde.

Although some resole resins contain minor amounts of dissolved water and water is produced in the foam forming polymerization reaction which provides some foam "blowing" by its vaporization due to the heat of the reaction exotherm, it is preferred to incorporate an organic blowing agent in the resole resin in order to obtain fine and uniform cell structure in the resulting foam as well as to have the capability of adjusting foam density to desired values. U.S. Pat. Nos. 3,298,973, 3,389,094, 3,968,300, and Plastic Foams, cited supra, disclose the use of a variety of auxiliary blowing agents and the disclosures of these references are specifically incorporated herein.

The amount of blowing agent employed is not critical and depends largely on factors such as the desired density of the phenolic foam, the viscosity of the resole resin, and, additionally, the type of blowing agent being employed. However, the preferred amount of any given formulation can be easily determined by simple trial and error. Generally speaking the blowing agent is employed within the range of about 2 to about 40 parts per 100 parts by weight of resole resin and preferably from about 5 to about 30 parts per 100 parts of resole resin.

A preferred group of blowing agents to be used in the practice of the present invention are the polyhalogenated fluorocarbons. Particularly preferred are the polyhalogenated fluorocarbons having a boiling point between 20° C and 130° C. Included in this range as preferred blowing agents are trichloromonofluoromethane and trichlorotrifluoroethane, and mixtures of the two.

The addition of minor amounts of low molecular weight water soluble polyols such as ethylene glycol, diethyleneglycol, glycerine, and the like, assists in the homogenization of water present in the reaction mixture which, in turn, gives rise to more even cell size when and if the water is volatilized and can aid in reducing minor splits or cracks in the foam. The actual amount of the polyol employed is not critical and can vary from about 1 to about 20 parts per 100 parts of resole.

It has also been found advantageous to employ a surfactant in the foams as an additional control over foam cell size and regularity. The choice of surfactant is not critical and any one, or mixtures thereof, of the many surfactants employed in the art can be employed in the present process; see U.S. Pat. No. 3,298,973 whose disclosure with respect to surfactants is hereby incorporated in its entirety.

When a surface active agent is employed it can be present in any amount depending on the results desired with respect to foam cell size, shape, etc. However, in most applications the surfactant is employed in the range of about 0.5 parts to 10 parts by weight per 100 parts of resole resin, and preferably from about 1 part to about 5 parts.

The novelty of the present invention resides in the catalyst employed for the curing of the resole resin and in its mode of preparation. The catalyst in question consists of a premixed combination of (a) an aryl sulfonic acid and (b) a phosphonate compound (I).

The aromatic sulfonic acid component of the catalyst is defined hereinbefore. Illustrative examples of such acids are benzene sulfonic acid, p-toluene sulfonic acid, 4-phenol sulfonic acid, xylene sulfonic acid, $\beta$-naphthalene sulfonic acid, $\alpha$-naphthalene sulfonic acid, 4-sulfophthalic acid, and the like. A preferred acid is p-toluene sulfonic acid. Mixtures of aromatic sulfonic acids are contemplated by the present invention and a preferred mixture comprises p-toluene sulfonic acid and xylene sulfonic acid in equal proportions by weight.

The aromatic sulfonic acid may be present either in the pure form or as a solution in water, glacial acetic acid, phenol, or the like. Generally speaking, it is conveniently employed in the form of its solution.

The phosphonate component (I), whose structure is defined hereinabove, belongs to a class of well known and readily available phosphorus compounds.

In a preferred phosphonate compound of the formula (I), R, $R_1$ and $R_2$ are independently selected from alkyl having from 1 to 8 carbon atoms inclusive.

Illustrative examples of the phosphonate compound (I) are dimethyl methylphosphonate, diethyl methylphosphonate, dibutyl methylphosphonate, dioctyl methylphosphonate, dimethyl butylphosphonate, dimethyl octylphosphonate, dimethyl 2-ethylhexylphosphonate, dimethyl phenylphosphonate, dibutyl phenylphosphonate, diphenyl phenylphosphonate, diphenyl methylphosphonate, dimethyl benzylphosphonate, dibenzyl methylphosphonate, dimethyl $\beta$-phenylethylphosphonate, diethyl naphthylmethylphosphonate, and the like.

A preferred group of phosphonate compounds is comprised of dimethyl methylphosphonate, diethyl methylphosphonate, dibutyl methylphosphonate, dioctyl methylphosphonate, dimethyl butylphosphonate, dimethyl octylphosphonate, dimethyl 2-ethylhexylphosphonate. A particularly preferred phosphonate compound is dimethyl methylphosphonate.

The phosphonate compounds as mentioned hereinabove are readily available commercially. Alternatively, they are prepared by the well known Arbuzov reaction wherein the appropriate halogen compound is reacted with the appropriate phosphite to yield the desired phosphonate; see Topics in Phosphorous Chemistry, Vol. I, p 65, edited by M. Grayson and E. J. Griffith, 1964, Interscience Publishers, New York, N. Y.

As mentioned hereinbefore the novelty of this invention resides in part in the premixing of the aromatic sulfonic acid with the phosphonate compound. This refers to the premixing of the catalyst components with each other prior to their addition to the resole resin.

The catalyst components may be blended together using any mixing or blending procedure known to those skilled in the art. Heat is evolved during the blending. Preferably, the mixing is carried out in the absence of significant atmospheric moisture and the absence of conditions of heat. In fact, if large batches are to be blended, it is recommended that the blending be done in a closed container to exclude atmospheric moisture and air but with means for venting and for cooling the container. The duration of mixing is not critical and generally speaking is from about 5 minutes to about 1 hour.

It is believed that the heat evolved during the mixing of the sulfonic acid with the phosphonate arises from an ester interchange reaction between the components. However, it is to be understood that such theoretical considerations are offered by way of explanation only and are not to be construed as limiting the scope of the present invention which is defined solely by the claims appended to this specification.

In a preferred embodiment of the premixed catalyst combination, the phosphonate compound is first blended with a diluent, preferably a non-ionic type diluent surfactant prior to its admixture with the sulfonic acid. Alternatively, the sulfonic acid is first blended with the diluent but no matter which component is chosen the blending operation is accompanied by the generation of some heat. The surfactants used for the above dilution are not to be confused with the surfactants already referred to above for use as cell modifiers and will be distinguished therefrom by the term "diluent surfactants". The diluent surfactants are employed not only to assist in the mixing of the catalyst components but also to modify the heat evolved during the mixing of the two components.

The choice of non-ionic diluent surfactant is not critical to the present invention. The diluent surfactant may be any one of a wide variety of surfactants such as alkylene oxide-phenol addition products, fatty acid esters, ester phosphatides, alkyl aryl sulfates and sulfonates, alkyl aryl polyether alcohols, long chain alkyl polyether alcohols, and the like.

The proportions of the phosphonate compound to the diluent surfactant in parts by weight are in no way critical but, generally speaking, are within the range of about 1:2 to about 2:1, and preferably about 1:1.

The proportions of phosphonate compound (I) to aromatic sulfonic acid in parts by weight is advantageously from about 5:1 to about 1:5, preferably from about 4:1 to about 1:4, and most preferably from about 3:1 to about 1:3.

The weight of the premixed catalyst combination, exclusive of the weight of any optional diluent, which is advantageously employed in the process of the invention is in the range of about 3 parts to about 30 parts per 100 parts of resole resin, and preferably from about 5 parts to about 20 parts.

In addition to the use of the catalyst combination set forth above it has been found that the optional addition of minor amounts of a heavy metal organic catalyst, within the range of about 0.5 parts to about 5 parts by weight per 100 parts of resin, and preferably from about 0.5 parts to about 2 parts, leads to an improvement in foam cell structure. Exemplary heavy metal catalysts are calcium naphthenate, cobalt nephthenate, iron naphthenate, manganese naphthenate, lead naphthenate, zinc octoate, lead octoate, and the like. Particularly preferred is lead octoate.

Various modifiers, flameproofing agents, additives, and fillers may be added to modify the resultant foam properties if desired. For example, the addition of polyvinyl alcohol imparts flexibility to the phenolic foam while finely divided fillers, such as talc, mica, asbestos, and carbon black ordinarily improve foam texture.

In a preferred embodiment of the present invention the resole resin is premixed with the blowing agent and any other optional ingredient including surfactants, modifiers, and the like. The catalyst combination is then thoroughly stirred into the resin premix and the resulting reacting mixture is delivered to a mold, conveyor, surface, or other suitable receiving means where it is allowed to rise freely.

The novel catalyst combination of the present invention allows the reactants to be combined at room temperature (about 20° C), and, surprisingly, after the foam has risen it can be cured also at room temperature to a thermoset state to produce foams of a density of from about 0.5 to about 20 pounds per cubic foot (pcf). Foams may be produced with higher density, however the heat dissipation problems become a factor in controlling the reaction. Contrastingly, the phenolic foams of the prior art require heat curing processes after the foam has risen in order to provide a completely thermoset product; see for example U.S. Pat. No. 3,298,973, column 5 line 9–10.

Although the foams of the invention are obtained with smooth skins and little or no shrinkage, even in the absence of a heat curing step, foam physical properties are usually maximized when the foam is formed in a preheated mold or container and cured at a temperature of from about 100° F to about 250° F for a period of from about 5 minutes to about 1 hour. The preheated mold temperature is not critical and can fall within the same range as that used for curing.

However, it is in the size and thickness of the foams prepared in accordance with the present invention wherein the most unexpected results lie. In contrast to prior art methods large machine prepared pours of the phenolic foams can be formed in large blocks in sizes exceeding those capable of preparation heretofore without cracking and splitting. Phenolic foams are notorious for the exotherms produced and resultant internal pressures produced by water vapor during the curing of the resole. Prior art methods have been limited to small bench scale pours. If large amounts were prepared the foam had to be formed in thin sections no greater than a few inches thick in order that the heat and volatile reaction by-products produced could be liberated so as to avoid cracks in the foam.

The use of the premixed catalyst combination of the present invention overcomes the excessive heat production during the resole curing and therefore allows the foam to be formed in sections at least 12 inches thick without cracking or splitting.

The foams produced in accordance with the present invention, in addition to being classified as non-punking, are further characterized as having excellent flame resistance and low smoke generation when subjected to flame testing. In fact, the foams when exposed to a flame test which is comparable to the ASTM E-84 Test were found to possess Flame Spread Ratings as low as 25.

In a further unexpected advantage to flow from the practice of the present invention it has been discovered that the premixed catalyst combinations in accordance with the invention, and particularly the foams produced thereby, do not possess the high corrosive properties encountered with prior art materials including both catalysts and the final foams.

The phenolic foams of the present invention are utilized in the production of preformed thermal insulation panels, such as roof and wall insulation, and particularly as the core insulant in prefabricated portable booths, kiosks, and the like. Further utility for the foams is found as sound insulation to deaden noise transmission through ceilings, floors or multi-story buildings, and various acoustical panels. The foams are also used in the floral trade in plant potting, as fire barriers in shipping and storage of pyrotechnic devices, as electric battery separators, and as decorative coatings in the building trade.

The following examples describe the manner and process of making and using the invention and set forth the best mode contemplated by the inventor of carrying out the invention but are not to be construed as limiting.

EXAMPLE 1

The phenolic foams A, B, and C of this example were prepared in accordance with the present invention by blending the reactants and proportions thereof set forth in Table I at ambient room temperature (about 20° C). The blending procedure consisted of first mixing the resole resin (BRL-2760) with the surfactant (L-5320) using a high speed drill press motor equipped with an efficient agitator blade. The Freon blowing agents were blended into the mixture followed by the boric acid anti-punking agent, ethylene glycol, and benzyltrimethylammonium chloride, where they were called for.

The premixed catalyst combinations were prepared by mixing in a separate container first the dimethyl methylphosphonate (DMMP) with the surfactant (TMN-10) followed by the mixed sulfonic acid combination of p-toluene-sulfonic acid and xylene sulfonic acid in equal proportions by weight which caused an immediate and substantial exotherm accompanied by a gradual increase in viscosity. Stirring of catalyst ingredients was continued by means of a suitable stirrer for about 15 minutes. The amine polyurethane catalyst Niax ES was added last where it was called for.

The premixed catalyst combination was then thoroughly stirred into the resin blend for about 30 – 60 seconds.

A sufficient amount of the ingredients was employed in each foam preparation so that, upon completion of stirring in the catalyst, approximately 2000 grams of each reaction mixture was poured into a 12 inch × 12 inch × 12 inch cardboard box which had been preheated to about 140° F. Each sample was allowed to exotherm and rise freely to form a solid block of foam about a cubic foot in volume. Post rise curing conditions for the foams are set forth in Table I. The foam blocks did not split or crack.

Foam B contained the art recognized anti-punking agent boric acid. Both Foam A and Foam C, which latter also lacked the additional agents including the anti-punking agent, were characterized by the same absence of punking as Foam B and excellent flame resistance including the lack of any smoke formation. Foam C was also characterized by a FSR=25 in a test which is comparable to the ASTM E-84 Tunnel Test.

TABLE I

| Foams | A | B | C |
|---|---|---|---|
| Resin ingredients (parts by weight): | | | |
| BRL-2760[1] | 100 | 100 | 100 |
| L-5320[2] | 4 | 4 | 4 |
| Freon-11[3] | 6 | 6 | 6 |
| Freon-113[4] | 6 | 6 | 6 |
| Boric acid | — | 15 | — |
| Ethylene glycol | 5 | 5 | — |
| Benzyltrimethyl-ammonium chloride solution[5] | 3 | 3 | — |
| Catalyst (parts by weight): | | | |
| Catalyst I[6] | 20 | — | — |
| Catalyst II[7] | — | 20 | — |
| Catalyst III[8] | — | — | 20 |
| Foam Rise Characteristics (minutes:seconds): | | | |
| Cream | 1:30 | <18:00 | 2:00 |
| Gel | 13:30 | — | — |
| Rise | 16:00 | <30:00 | 17:00 |
| Foam Curing Conditions: | 15 minutes 130-140° F then stand overnight at room temp. | 1 hr./150° F | 1 hr./110° F |
| Foam Properties: | | | |
| Core density, pcf | 1.61 | 2.38 | 2.29 |
| Closed cells (%) | — | 4.0 | 3.6 |
| Flammability characteristics[9]: | | | |
| Flame resistance (FR) | Excellent | Excellent | Excellent |
| Smoke formation | None | None | None |
| Punking | None | None | None |
| 4 ft. Tunnel, flame spread rating (FSR) | 38 | — | 25 |

Footnotes to Table I
[1]BRL-2760 is a proprietary liquid phenol-formaldehyde resole resin supplied by Union Carbide Corp., 270 Park Ave., New York 17, N. Y.; viscosity = 2300 – 6500 centipoise at 25° C; pH = 6.0–6.3.
[2]L-5320 is a proprietary silicone surfactant supplied by Union Carbide Corp., 270 Park Ave., New York 17, N. Y.
[3]Freon-11 is a trichloromonofluoromethane supplied by Union Carbide Corp., 270 Park Ave., New York 17, N. Y.
[4]Freon-113 is trichlorotrifluoroethane supplied by Union Carbide Corp., 270 Park Ave., New York 17, N. Y.
[5]The benzyltrimethylammonium chloride solution is 40 percent by weight in methanol. Supplied by Sumner Div. of Miles Laboratories, Zeeland, Michigan.
[6]Catalyst I was a premixed catalyst combination comprising the following ingredients and their proportions in parts by weight:
  2 parts of dimethyl methylphosphonate (DMMP). Supplied by Stauffer Chem., 299 Park Ave., New York, N.Y.
  2 parts of TMN-10, a nonionic surfactant prepared from the reaction of about 10 moles of ethylene oxide with trimethylnonanol, supplied by Union Carbide Corp., 270 Park Ave., New York 17, N. Y.
  3 parts of a combination of p-toluenesulfonic acid and xylene sulfonic acid in equal parts by weight (Ultra TX Acid, supplied by Witco Chemical Co., 277 Park Ave., New York, N.Y.)
  1 part of Niax Catalyst ES, a proprietary silicone amine polyurethane catalyst supplied by Union Carbide Corp., 270 Park Ave., New York 17, N. Y.
[7]Catalyst II was a premixed catalyst combination comprising the following ingredients and their proportions in parts by weight
  2 parts DMMP
  2 parts TMN-10
  6 parts of Ultra TX Acid defined in Footnote 6 above.
  1 part Niax Catalyst ES.
[8]Catalyst III was a premixed catalyst combination comprising the following ingredients and their proportions in parts by weight
  2 parts DMMP
  2 parts TMN-10
  6 parts of Ultra TX Acid defined in Footnote 6 above.
[9]Flammability characteristics are determined using the following procedures:
  (a) Flame resistance (FR) is determined qualitatively by positioning the center of a 4" by 4" by 1" piece of the foam sample in the blue oxidizing flame of a Meeker burner about 2" above the top of the burner and noting the burning characteristics of the sample while at the same time observing the smoke which is being generated.
  (b) The test for punking is performed by holding a 6" × 6" × 2" sample of the foam above the same blue flame described above and about 2" above the burner top so that the flame impinges on the middle of one 6" face of the sample for about 3 minutes. The sample is then removed from the flame and its burned side superimposed immediately on the charred face of another similarly sized sample of the same foam which had been allowed to cool. The test is considered positive for punking when the heat radiation from the hotpiece of foam causes both pieces to ignite or glow.
  (c) The 4 ft. Tunnel test is a miniaturized adaptation of the ASTM E-84 Tunnel Test and the FSR values obtained from a calibrated 4 ft. Tunnel are considered comparable to those obtained in the ASTM E-84 test.

EXAMPLE 2

Using the procedure set forth in Example 1 and the ingredients and proportions set forth in Table II there were prepared the following Foams D, and F to H in accordance with the present invention wherein a mixture of two different resoles were employed. Foam E which contained insufficient catalyst exhibited shrinkage and therefore was not prepared in accordance with the present invention.

The addition of the heavy metal catalyst provided a foam characterized by a fine cell structure.

TABLE II

| Foams | D | E | F | G | H |
|---|---|---|---|---|---|
| Resin ingredients (parts by weight): | | | | | |
| BRL-2760 | 100 | 100 | 100 | 100 | 100 |
| R-2170[1] | 20 | 40 | 20 | 30 | 20 |
| L-5320 | 2 | 2 | 2 | 2 | — |
| Tween 40[2] | — | — | — | — | 2 |
| Glycerine | 5 | — | — | — | — |
| 37% aqueous formaldehyde solution | — | — | 10 | 10 | 10 |
| Freon-113 | 10 | 10 | 5 | 5 | 5 |
| Catalyst (parts by weight): | | | | | |
| Catalyst IV | 5 | 2 | 4 | — | 4 |
| Catalyst V[4] | — | — | — | 7 | — |
| Foam Rise Characteristics (mins.:secs.): | | | | | |
| Cream | 1:10 | 0:40 | 0:45 | 0:60 | 0:70 |
| Gel | 2:40 | — | 3:52 | 4:00 | 3:40 |
| Rise | 3:55 | — | 4:45 | 4:45 | 4:22 |
| Foam Curing Conditions: | | | | | |
| 160° F cure for the times specified in minutes | 10 | 10 | 10 | 3 | 10 |
| Shrinkage | slight | yes | very slight | very slight | very slight |
| Core density, pcf | — | — | 1.98 | 1.96 | 2.93 |
| Cell structure | — | — | medium to fine | fine | medium |
| Flammability characteristics: | | | | | |
| FR | Excellent | — | Excellent | Excellent | Excellent |
| Smoke | None | — | None | None | None |
| Punking | None | — | None | None | None |

Footnotes to Table II
[1]R-2170 is a proprietary liquid resorcinol formaldehyde resin supplied by Koppers Co., Inc., Pittsburgh, Pa., (75 + 1% solids, visc. = 50 poise at 23° C, pH 0.5 – (1.5).
[2]Tween 40 is a proprietary surfactant supplied by Atlas Powder Co., Div. of ICI America and is polysorbate polyoxyethylene sorbitan monopalmitate.
[3]Catalyst IV was a premixed catalyst combination comprising the following ingredients and their proportions in parts by weight:
 1 part of Carboxane NW a proprietary surfactant supplied by Textilana Ind., Hawthorne, California
 1 part DMMP
 3 parts of Ultra TX Acid defined in Footnote 6 of Table I above.
[4]Catalyst V was a premixed catalyst combination comprising the following ingredients and their proportions in parts by weight:
 4 part of Catalyst IV
 parts of a 24% weight solution of lead octoate in Rule 66 exempt mineral spirits supplied by Tenneco Chemical, Nuodex Division, Piscataway, N. J.

EXAMPLE 3

Using the procedure set forth in Example 1 and the ingredients and proportions set forth in Table III Foam I, not in accordance with the present invention, was prepared. The foam punked in spite of the fact that it contained boric acid.

TABLE III

| Foam | I |
|---|---|
| Resin ingredients (pts. by wt.): | |
| BRL-2760 | 120 |
| L-5340[1] | 2 |
| Freon 11 | 20 |
| Boric acid | 15 |
| Catalyst (pts. by wt.): | |
| Catalyst VI[2] | 30 |
| Foam rise characteristics: (mins.:secs.): | |
| Cream | 0:60 |
| Rise | >12:00 |
| Foam cured 15 min./150° F | |
| Core density | 2.96 |
| Punking | Foam Punks |

Footnotes to Table III
[1]L-5340 is a proprietary silicone surfactant supplied by Union Carbide Corp., 270 Park Ave., New York 17, N. Y.
[2]Catalyst VI was a premixed catalyst combination comprising the following ingredients and their proportions in parts by weight:
 3 parts of a solution of 60% by weight of phenolsulfonic acid in phenol
 6 parts of ethylene glycol
 21 parts of 85% phosphoric acid.

EXAMPLE 4

Using the procedure set forth in Example 1 and the various resole mixtures and proportions set forth in Table IV the following room temperature (about 20° C) curable phenolic foams (J to O) in accordance with the present invention were prepared. Good foam skins were observed in spite of the absence of any heat curing. Although good foams were obtained at room temperature without any necessity for oven curing, foam strength was maximized by curing for 2 hours at about 150° F.

TABLE IV

| Foam | J | K | L | M | N | O |
|---|---|---|---|---|---|---|
| Resin ingredients (pts. by wt.): | | | | | | |
| RN441 solution[1] | 20 | 20 | 20 | 20 | 40 | 40 |
| BRL-2760 | 60 | 60 | — | — | 80 | — |
| RI-5100[2] | — | — | 60 | 60 | — | 80 |
| WS-3-85[3] | 40 | — | 40 | — | — | — |
| MB-11[4] | — | 40 | — | 40 | — | — |
| L-5350[5] | 2 | 2 | 2 | 2 | 2 | 2 |
| Freon-11 | 10 | 10 | 10 | 10 | 10 | — |
| Boric acid | 15 | 15 | 15 | 15 | 15 | 15 |
| Catalyst (pts. by wt.): | | | | | | |
| Catalyst IV | 15 | 10 | 10 | 10 | 15 | 15 |
| Foam rise characteristics (mins.:secs.) | | | | | | |
| Cream | 0:10 | 0:60 | 0:60 | 0:30 | 0:10 | ::10 |
| Gel | 5:00 | 9:00 | 10:30 | 9:00 | 1:30 | 2:05 |
| Rise | 6:10 | 12:00 | 13:00 | 10:30 | 2:30 | 2:55 |
| Shrinkage | very slight | very slight | very slight | very slight | very slight | some |
| Cell structure | fine | fine | fine | fine | fine | fine |
| Core density | 1.73 | 1.92 | 2.02 | 1.92 | 1.54 | 1.95 |
| Flammability characteristics: | | | | | | |
| FR | Excellent | Excellent | Excellent | Excellent | Excellent | Excellent |
| Smoke | None | None | Slight after burn | Slight after burn | None | None |
| Punking | None | None | None | None to very slight | None | None |
| Compressive str. ∥ to rise (psi): | | | | | | |
| Room temp. cure | — | 11.8 | 11.5 | 12.0 | — | — |
| Cured at 150° F/2 hrs. | — | 13.1 | 14.5 | 13.2 | — | — |

Footnotes to Table IV
[1]RN441 solution is a 60% solution by weight of RN441, a resorcinol-formaldehyde resle resin, dissolved in ethylene glycol. The RN441 is supplied by Koppers Co. Inc., Pittsburgh, Pa.
[2]RI-5100 is a resole resin supplied by Monsanto Chemical Corp., Pittsburgh, Pa; viscosity at 25° C = 35000 cps, pH 4.6, 85% solids content.
[3]WS-3-85 is a proprietary, in-house, resole resin obtained from Borden Chemical Corp., Portland, Oregon.
[4]MB-11 is a proprietary, in-house, resole resin obtained from Borden Chemical Corp., Portland, Oregon.
[5]L-5350 is a proprietary silicone surfactant supplied by Union Carbide Corp., 270 Park Ave., New York 17, N. Y.

EXAMPLE 5

Using the procedure set forth in Example 1 and the ingredients and proportions set forth in Table V the following room temperature curable phenolic foams (P-1 to R-2) in accordance with the present invention were prepared.

When the resin employed was BRL-2760 the density of the product foams could be increased by the addition of a brominated aromatic fire retardant additive as seen in the comparison of Foam P-1 to P-2 and Q-1 to Q-2. When the resin was RI-5100 the addition of the fire retardant had no effect of foam density as noted in the comparison of Foam R-1 to R-2. The addition of the minor amount of the RN441 resin to the BRL-2760 gave rise to an increase in foaming reactivity as noted in the comparison of the rise characteristics of Foam Q-1 to P-1 and Foam Q-2 to P-2

TABLE V

| Foam | P-1 | P-2 | Q-1 | Q-2 | R-1 | R-2 |
|---|---|---|---|---|---|---|
| Resin ingredients (pts. by wt.): | | | | | | |
| BRL-2760 | 120 | 120 | 120 | 120 | — | — |
| RN441 solution[1] | — | — | 20 | 20 | — | — |
| RI-5100 | — | — | — | — | 120 | 120 |
| L-5350 | 2 | 2 | 2 | 2 | 2 | 2 |
| Freon-11 | 10 | 10 | 10 | 10 | 10 | 10 |
| UK-60[2] | — | 15 | — | 15 | — | 15 |
| Catalyst (pts. by wt.): | | | | | | |
| Catalyst IV | 10 | 10 | 10 | 10 | 10 | 7.5 |
| Foam rise characteristics: (mins.:secs.) | | | | | | |
| Cream | 0:20 | 0:20 | 0:10 | 0:10 | 0:10 | 0:15 |
| Gel | 7:00 | 10:15 | 2:00 | 4:30 | 4:00 | 10:45 |
| Rise | 8:30 | 12:30 | 2:40 | 5:30 | 5:15 | 12:00 |
| Foam core density pcf | 1.18 | 1.68 | 0.98 | 1.51 | 1.82 | 1.78 |

Footnotes to Table V
[1] See Footnote 1 of Example 4.
[2] A 50% by weight solution of a brominated aromatic fire retardant compound in ethylene glycol supplied by Great Lakes Chemical Corp., and consists of:
 tetrabromobisphenol A (46 – 54%),
 2,4,6-tribromophenol (25 - 29%), and
 di and tribromobisphenol A (10 - 17%).

EXAMPLE 6

A machine pour preparation of a phenolic foam in accordance with the present invention was performed using a resin component mixture which was comprised of the following ingredients in the proportions indicated: BRL-2760 120 parts, glycerine 10 parts, L-5320 4 parts, Freon 11 10 parts, and 10 parts of the premixed catalyst combination identified as Catalyst IV in Example 2. The resin component was at 85° F while the catalyst component was at ambient room temperature.

The two components were reacted in a 12 lb. Admiral Foam Machine (manufactured by the Admiral Equipment Corporation, Akron, Ohio) employing a high speed conical self cleaning head and at the rate of 299 grams of resin component with 25.2 grams of catalyst component per 6 seconds, or 7.14 lbs./minute. The reaction mixture was discharged into 14 inch × 14 inch × 18 inch cardboard boxes and allowed to rise freely. The foam was characterized by a cream time of 55 seconds; gel of 5 minutes, 10 seconds, rise of 7 minutes, 30 seconds; and a gel/rise = 0.689. Curing of the foam blocks was carried out in an oven at 250° F for 5 minutes to eliminate any possibility of shrinkage.

Because the self cleaning head caused pressure buildup, it was replaced by a basket type head and the foam preparation repeated with an additional 2 parts of methyl formate added to the resin side. The foam was characterized by a cream time of 70 seconds; gel of 5 minutes; rise of 6 minutes, 30 seconds; and a cup foam core density of 1.55 pcf. and a box foam core density of 1.29 pcf. The phenolic foams obtained above were characterized by excellent flame resistance, no smoke and no punking when tested in a Meeker burner in accordance with the test procedures described previously. No cracking or splitting of the foam was observed in spite of the size of the blocks.

EXAMPLE 7

Using the procedure set forth in Example 1 except that the foams were prepared in 1 quart cups, and the reagents and proportions set forth in Table VI, there were prepared Foams S and T in accordance with the present invention. Foam S employed as the premixed catalyst combination the premixed Catalyst IV defined in Example 2 in combination with the additional acid of 4-sulfophthalic acid. Foam T employed the premixed catalyst combination of DMMP with 4-sulfophthalic acid.

The reaction was carried out with the components at room temperature. The foams were cured at room temperature with slight shrinkage observed. When foam T was tested in accordance to the flammability test described in Example 1 it was characterized by excellent flame resistance, no smoke, and no punking.

TABLE VI

| Foam | S | T |
|---|---|---|
| Resin ingredients (pts. by wt.): | | |
| BRL-2760 | 120 | 120 |
| L-5320 | 2 | 2 |
| Freon 11 | 10 | 10 |
| Catalyst (pts. by wt.): | | |
| Catalyst VII[1] | 20 | — |
| Catalyst VIII[2] | — | 40 |
| Foam rise characteristics: (mins.:secs.) | | |
| Cream | 1:20 | 1:10 |
| Gel | 8:00 | 20:00 |
| Rise | 10:30 | >20:00 |
| Foam core density (pcf.) | 2.02 | 4.35 |
| Shrinkage | — | slight when cured at room temperature |
| Flammability characteristics: | | |
| Flame rating | — | Excellent |
| Smoke | — | None |
| Punking | — | None |

Footnotes to Table VI
[1] Catalyst VII was a premixed catalyst combination comprising the following ingredients and their proportions in parts by weight:
 10 parts of catalyst IV
 10 parts of a 50% by wt. solution of 4-sulfophthalic acid in water.
[2] Catalyst VIII was a premixed catalyst combination comprising the following ingredients and their proportions in parts by weight:
 20 parts of DMMP
 20 parts of a 50% by wt. solution of 4-sulfophthalic acid in water.

I claim:

1. In a process for the preparation of a phenolic foam by the reaction of a phenol-aldehyde resole resin, a blowing agent and an acidic catalyst, the improvement which comprises employing a premixed catalyst combination comprising:

(a) an aromatic sulfonic acid; and
 (b) a phosphonate compound having the formula $$R-P\begin{matrix}\nearrow O \\ \searrow OR_1 \\ OR_2\end{matrix}$$

wherein R, $R_1$ and $R_2$ are each independently selected from the class consisting of alkyl having from 1 to 8 carbon atoms, inclusive, aryl having from 6 to 12 carbon atoms inclusive, and aralkyl having from 7 to 13 carbon atoms inclusive and wherein the proportion in parts by weight of said phosphonate compound to said aromatic sulfonic acid is from about 5:1 to 1:5, and said premixed catalyst combination is employed in the range of about 3 parts to about 30 parts per 100 parts of said resole resin.

2. A process in accordance with claim 1 wherein R, $R_1$ and $R_2$ of said phosphonate compound are each independently selected from alkyl having from 1 to 8 carbon atoms inclusive.

3. A process in accordance with claim 1 wherein R, $R_1$ and $R_2$ of said phosphonate compound are each independently selected from aryl having from 6 to 12 carbon atoms inclusive.

4. A process in accordance with claim 1 wherein R, $R_1$ and $R_2$ of said phosphonate compound are each independently selected from aralkyl having from 7 to 13 carbon atoms inclusive.

5. In a process for the preparation of a phenolic foam by the reaction of a phenol-formaldehyde resole resin, a blowing agent and an acidic catalyst, the improvement which comprises employing a premixed catalyst combination comprising:
   (a) an aromatic sulfonic acid; and
   (b) a phosphonate compound having the formula

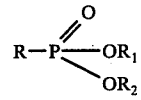

wherein R, $R_1$ and $R_2$ are each independently selected from alkyl having from 1 to 8 carbon atoms inclusive.

6. A process in accordance with claim 5 wherein said phosphonate compound (b) is preblended with a non-ionic diluent surfactant.

7. A process in accordance with claim 5 wherein said aromatic sulfonic acid is a mixture of p-toluenesulfonic acid and xylene sulfonic acid in equal proportions by weight.

8. A process in accordance with claim 5 wherein said phosphonate compound is dimethyl methylphosphonate.

9. A process in accordance with claim 5 wherein said catalyst combination also contain a heavy metal organic catalyst.

10. A process for the preparation of a phenolic foam said process comprising reacting a phenol-formaldehyde resole resin and a blowing agent in the presence of a premixed catalyst combination comprising:
    (a) a mixture of p-toluenesulfonic acid and xylene sulfonic acid in equal proportions by weight, and
    (b) dimethyl methylphosphonate preblended with a non-ionic diluent surfactant.

11. A phenolic foam prepared according to the process set forth in claim 1.

* * * * *

UNITED STATES PATENT OFFICE
CERTIFICATE OF CORRECTION

Patent No. 4,075,139                    Dated February 21, 1978

Inventor(s) Richard L. Greer

It is certified that error appears in the above-identified patent and that said Letters Patent are hereby corrected as shown below:

| | |
|---|---|
| Column 3, line 36: | Should read: |
| of any | for any |
| Column 8, Table I, lines 9 and 10: | Should read: |
| 15 minutes 130-140°F | 15 minutes/130-140°F |
| Column 9, Table II, line 17: | Should read: |
| Catalyst IV | Catalyst IV[3] |
| Column 9, Table II, line 37, Footnote 1: | Should read: |
| - (1.5). | - 1.5). |
| Column 9, Table II, line 46, Footnote 4: | Should read: |
| parts | 3 parts |
| Column 10, Table IV, line 34, Freon 11 under Foam O: | Should read: |
| (proportion was omitted) | 10 |

UNITED STATES PATENT OFFICE
CERTIFICATE OF CORRECTION

Patent No. 4,075,139                     Dated February 21, 1978

Inventor(s) Richard L. Greer

It is certified that error appears in the above-identified patent and that said Letters Patent are hereby corrected as shown below:

Column 10, Table IV, line 40, Cream under Foam O:

::10

Should read:

0:10

Column 10, Table IV, line 61, Footnote 1:

resle

Should read:

resole

Column 11, line 13:

of foam

Should read:

on foam

Column 12, line 24:

shrinkage observed

Should read:

shrinkage being observed

Column 12, line 25:

tested in accordance

Should read:

tested according

UNITED STATES PATENT OFFICE
CERTIFICATE OF CORRECTION

Patent No. 4,075,139                    Dated February 21, 1978

Inventor(s) Richard L. Greer

It is certified that error appears in the above-identified patent and that said Letters Patent are hereby corrected as shown below:

Column 13, claim 1, line 6:     Should read:

to 1:5                          to about 1:5

Column 14, claim 9, line 21:    Should read:

contain                         contains

Signed and Sealed this

Fourth Day of July 1978

[SEAL]

Attest:

RUTH C. MASON
Attesting Officer

DONALD W. BANNER
Commissioner of Patents and Trademarks